United States Patent
Liu et al.

(10) Patent No.: US 8,554,079 B2
(45) Date of Patent: Oct. 8, 2013

(54) WAVELENGTH DIVISION AND TIME DIVISION MULTIPLEX MIXING PASSIVE OPTICAL NETWORK SYSTEM, TERMINAL AND SIGNAL TRANSMISSION METHOD

(75) Inventors: Deming Liu, Shenzhen (CN); Songlin Zhu, Shenzhen (CN); Minming Zhang, Shenzhen (CN); Hai Liu, Shenzhen (CN); Li Zhang, Shenzhen (CN); Changjian Ke, Shenzhen (CN); Sui Xiao, Shenzhen (CN)

(73) Assignee: ZTE Corporation, Wuhan (CN)

( * ) Notice: Subject to any disclaimer, the term of this patent is extended or adjusted under 35 U.S.C. 154(b) by 418 days.

(21) Appl. No.: 12/676,588

(22) PCT Filed: Sep. 5, 2008

(86) PCT No.: PCT/CN2008/072282
§ 371 (c)(1),
(2), (4) Date: Mar. 4, 2010

(87) PCT Pub. No.: WO2009/033415
PCT Pub. Date: Mar. 19, 2009

(65) Prior Publication Data
US 2010/0196011 A1   Aug. 5, 2010

(30) Foreign Application Priority Data
Sep. 5, 2007   (CN) .......................... 2007 1 0053129

(51) Int. Cl.
*H04J 14/00*   (2006.01)
(52) U.S. Cl.
USPC ............................................. 398/69; 398/72
(58) Field of Classification Search
USPC ..................................................... 398/69, 72
See application file for complete search history.

(56) References Cited

U.S. PATENT DOCUMENTS

| | | | |
|---|---|---|---|
| 6,753,993 B1* | 6/2004 | Larchuk | 359/244 |
| 2002/0171896 A1* | 11/2002 | Clark et al. | 359/172 |
| 2007/0019956 A1 | 1/2007 | Sorin et al. | |
| 2008/0304830 A1 | 12/2008 | Huang et al. | |
| 2010/0196010 A1* | 8/2010 | Miura | 398/72 |

FOREIGN PATENT DOCUMENTS

| | | | |
|---|---|---|---|
| CN | 1547335 A | 11/2004 | |
| CN | 101009530 A | 8/2007 | |
| CN | 101114885 A | 1/2008 | |
| JP | 2002-261697 | 9/2002 | |
| WO | WO 2007/066757 | * 6/2007 | H04B 10/17 |
| WO | WO2007074297 A1 | 7/2007 | |

OTHER PUBLICATIONS

Shea et al., "Experimental Upstream Demonstration of a Long Reach Wavelength-Converting PON with DWDM Backhaul", Department of Electronic & Electrical Engineering, University of London, © 2006, 3 pages.

* cited by examiner

*Primary Examiner* — Nathan Curs
(74) *Attorney, Agent, or Firm* — Woodcock Washburn LLP

(57) ABSTRACT

A wavelength division and time division hybrid multiplexing passive optical network system, terminals and a signal transmission method are disclosed in the present invention. The system comprises: a plurality of optical modules at the optical line terminal side connecting to an office all-optical wavelength conversion unit, the all-optical wavelength conversion unit connecting with a subscriber all-optical wavelength conversion unit via a fiber, and the subscriber all-optical wavelength conversion unit connecting with a plurality of optical couplers, and each optical couplers connecting with a plurality of optical network units respectively; the present invention facilitates full use of the existing source of access network and ensures a smooth transition from the time division multiplexing passive optical network to the optical access network of the next generation without changing the structure of the current time division passive optical network.

5 Claims, 3 Drawing Sheets

US 8,554,079 B2

WAVELENGTH DIVISION AND TIME DIVISION MULTIPLEX MIXING PASSIVE OPTICAL NETWORK SYSTEM, TERMINAL AND SIGNAL TRANSMISSION METHOD

CROSS-REFERENCE TO RELATED APPLICATIONS

This application is the National Stage of International Application No. PCT/CN2008/072282, filed Sep. 5, 2008, which claims the benefit of Chinese Patent Application No. 200710053129.9, filed Sep. 5, 2007, the disclosure of which is incorporated herein by reference in its entirety.

TECHNICAL FIELD

The present invention relates to the field of optical access network, and more specifically, to a wavelength division and time division hybrid multiplexing passive optical network system, a terminal and a signal transmission method thereof.

BACKGROUND OF THE RELATED ART

Optical access is an essential part of the next-generation network, and is the main direction of the development of the optical communication technology in the next ten years. In view of the increasing requirements of various services for compatible access, research on new access means and new access techniques is of great importance.

Passive optical network (PON) is one of the important techniques for optical access. The current techniques mainly comprise wavelength division multiplexing passive optical network (WDM-PON) and time division multiplexing passive optical network (TDM-PON), wherein gigabit passive optical network (G-PON) and Ethernet network passive optical network (E-PON) are included.

The access capacity of E-PON and G-PON in a single fiber is limited, and currently there is only 32-line or 64-line. If the computer rooms of the office end are disposed across different regions, dozens of fibers have to be laid between an optical line terminal (OLT) and an optical network unit (ONU) with a distance of 10-40 km therebetween, which will not only cause a high cost for establishment and maintenance, but also will have the problem of limited fiber sources of access lines.

If the ONU of a WDM-PON adopts a laser with a specific transmission wavelength, then problems of mounting, maintenance and storage will arise. Therefore, all the ONU optical transceiving modules have to be uniform, i.e., achieving a so-called colorless ONU.

The existing solution for realizing colorless ONU either adopts a non-modulated light source provided externally to the ONU, as described in Chinese invention patent CN200510131990, or controls the tunable laser in the ONU by the OLT, as described in US invention patent US2007092256. However, externally providing a non-modulated light source to the ONU will cause a series of technical problems. For example, the optical power of the non-modulated light source will be greatly attenuated after downlink transmission. The structure of the network will be complicated in order to compensate attenuation of the optical power. Furthermore, this technique is not compatible with the technology of the current G-PON optical transceiving module.

SUMMARY OF THE INVENTION

The object of the present invention is to solve the existing problem in the current technology by providing a wavelength division and time division hybrid multiplexing passive optical network system and terminal, so as to achieving wavelength division multiplex of multiple time division multiplexing PON units without changing the optical wavelength of the ONU at the subscriber side.

Another object of the present invention is providing a signal transmission method used for the wavelength division and time division hybrid multiplexing passive optical network system and terminal.

In order to solve the above technical problem, the present invention provides a wavelength division and time division hybrid multiplexing passive optical network system, comprising: a plurality of optical modules at the optical line terminal side connecting to an office all-optical wavelength conversion unit, the office all-optical wavelength conversion unit connecting with a subscriber all-optical wavelength conversion unit via a fiber, and the subscriber all-optical wavelength conversion unit connecting with a plurality of optical distributors, and each optical coupler connecting with a plurality of optical network units respectively; wherein, The office all-optical wavelength conversion unit converts the optical signals with the same wavelength emitted from the optical modules into optical signals with different wavelengths in a downlink direction, multiplexes and sends the optical signals to the subscriber all-optical wavelength conversion unit; demultiplexes the optical signals with different wavelengths from the subscriber all-optical wavelength conversion unit in the uplink direction, and sends the optical signals to the optical modules at the optical line terminal side for reception;

The subscriber all-optical wavelength conversion unit demultiplexes the optical signals with different wavelengths sent by the office all-optical wavelength conversion unit in the downlink direction, and transmits the optical signals with different wavelengths to corresponding optical couplers respectively, and the optical signals with different wavelength are then allocated by the optical couplers to the optical network units connecting thereto; the subscriber all-optical wavelength conversion unit receives in the uplink direction optical signals with a same wavelength from the optical network units and collected by the optical couplers, and converts the optical signals with the same wavelength into optical signals with different wavelengths, multiplexes and then sends the optical signals to the office all-optical wavelength conversion unit.

Furthermore, the optical modules connecting with the office all-optical wavelength conversion unit are least two;

The office all-optical wavelength conversion unit comprises at least two office 3-port wavelength division multiplexers, at least two office optical wavelength converters and an office wavelength division multiplexer, wherein an uplink multiplexing port of each office 3-port wavelength division multiplexer respectively connects with an uplink demultiplexing port of the office wavelength division multiplexer, a downlink demultiplexing port of each office 3-port wavelength division multiplexer respectively connects with an input port of the office optical wavelength converter, an output port of each office optical wavelength converter connects with a downlink multiplexing port of the office wavelength division multiplexer, and the third port of each office 3-port wavelength division multiplexer connects with an optical module respectively; wherein, the office 3-port wavelength division multiplexers respectively multiplex and demultiplex the optical signals with different wavelengths in uplink and downlink directions, the office optical wavelength converters convert the downlink optical signals with the same wavelength emitted by the optical modules and received from the office 3-port wavelength division multiplexers into optical signals with different wavelengths, and send the optical signals to the office wavelength division multiplexer for multiplexing.

Furthermore, the optical couplers connecting with the subscriber all-optical wavelength conversion unit are least two;

The subscriber all-optical wavelength conversion unit comprises a subscriber wavelength division multiplexer, at least two subscriber optical wavelength converters and at least two subscriber 3-port wavelength division multiplexers, wherein a downlink multiplexing port of each subscriber 3-port wavelength division multiplexer respectively connects with a downlink demultiplexing port of the subscriber wavelength division multiplexer, an uplink demultiplexing port of each subscriber 3-port wavelength division multiplexer respectively connects with an input port of the subscriber optical wavelength converter, an output port of each subscriber optical wavelength converter connects with an uplink multiplexing port of the subscriber wavelength division multiplexer, and the third port of each subscriber 3-port wavelength division multiplexer connects with an optical coupler respectively; wherein, the subscriber 3-port wavelength division multiplexers respectively demultiplex and multiplex the optical signals with different wavelengths in uplink and downlink directions, the subscriber optical wavelength converters convert the uplink optical signals with a same wavelength emitted by the optical network units and received from the subscriber 3-port wavelength division multiplexers into optical signals with different wavelengths, and send the optical signals to the subscriber wavelength division multiplexer for multiplexing.

Furthermore, the subscriber optical wavelength converters are made of passive wavelength conversion media, a probe light source of the subscriber optical wavelength converters is disposed at the optical line terminal side, and the remote transmission of the probe light is implemented through a fiber; or the subscriber optical wavelength converters are made of active wavelength conversion media.

The present invention also provides a wavelength division and time division hybrid multiplexing passive optical network system, comprising: a plurality of optical modules with specific transmission wavelengths at the optical line terminal side connecting to an office wavelength division multiplexer, the office wavelength division multiplexer connecting with a subscriber all-optical wavelength conversion unit via a fiber, the subscriber all-optical wavelength conversion unit connecting to a plurality of optical couplers in a downlink direction, and each optical coupler connecting with a plurality of optical network units respectively in the downlink direction; wherein, the office wavelength division multiplexer multiplexes the optical signals with different wavelengths emitted by the optical modules with specific transmission wavelengths in the downlink direction, and sends the optical signals to the subscriber all-optical wavelength conversion unit; demultiplexes the optical signals with different wavelengths from the subscriber all-optical wavelength conversion unit in the uplink direction, and sends the optical signals to the optical modules at the optical line terminal side for reception;

the subscriber all-optical wavelength conversion unit demultiplexes the optical signals with different wavelengths from the office wavelength division multiplexer in the downlink direction, and transmits the optical signals with different wavelengths to the corresponding optical couplers respectively, and the optical signals with different wavelengths are then allocated by the optical couplers to the optical network units connecting thereto; the subscriber all-optical wavelength conversion unit receives in the uplink direction the optical signals with a same wavelength from the optical network units collected by the optical couplers, and converts the optical signals with the same wavelength into optical signals with different wavelengths, multiplexes and then sends the optical signals to the office wavelength division multiplexer.

Furthermore, the optical distributors connecting with the subscriber all-optical wavelength conversion unit are least two;

The subscriber all-optical wavelength conversion unit comprises a subscriber wavelength division multiplexer, at least two subscriber optical wavelength converters and at least two subscriber 3-port wavelength division multiplexers, wherein a downlink multiplexing port of each subscriber 3-port wavelength division multiplexer respectively connects with a downlink demultiplexing port of the subscriber wavelength division multiplexer, an uplink demultiplexing port of each subscriber 3-port wavelength division multiplexer respectively connects with an input port of the subscriber optical wavelength converter, an output port of each subscriber optical wavelength converter connects with an uplink multiplexing port of the subscriber wavelength division multiplexer, and the third port of each subscriber 3-port wavelength division multiplexer connects with an optical coupler respectively; wherein, the subscriber 3-port wavelength division multiplexers respectively demultiplex and multiplex the optical signals with different wavelengths in uplink and downlink directions, the subscriber optical wavelength converters convert the uplink optical signals with a same wavelength emitted by the optical network units and received from the subscriber 3-port wavelength division multiplexers into optical signals with different signals, and send the optical signals to the subscriber wavelength division multiplexer for multiplexing.

Furthermore, the subscriber optical wavelength converters are made of passive wavelength conversion media, a probe light source of the subscriber optical wavelength converters is disposed at the optical line terminal side, and the remote transmission of the probe light is implemented through a fiber; or the subscriber optical wavelength converters are made of active wavelength conversion media.

The present invention also provides an optical line terminal, comprising a plurality of optical modules and an office all-optical wavelength conversion unit, wherein the optical modules are used to generate optical signals with a same wavelength in a downlink direction, and to send the optical signals to the office all-optical wavelength conversion unit;

the office all-optical wavelength conversion unit is used to convert the optical signals into optical signals with different wavelengths in the downlink direction, and multiplexes the optical signals with different wavelengths; demultiplexes the optical signals with different wavelengths in the uplink direction and then sends the optical signals to the optical modules at the optical line terminal side for reception.

Furthermore, the optical line terminal also comprises a probe light source used to provide probe light for the subscriber all-optical wavelength conversion unit.

The present invention also provides an optical line terminal, comprising at least two optical modules with specific transmission wavelengths and an office wavelength division multiplexer, wherein, the optical modules with specific transmission wavelengths are used to generate optical signals with different wavelengths in the downlink direction, and to send the optical signals to the office wavelength division multiplexer.

The office wavelength division multiplexer is used to multiplex the optical signals in the downlink direction; demultiplexes the optical signals with different wavelengths in the uplink direction and sends the optical signals to the optical modules;

The terminal also comprises a probe light source used to provide probe light for a subscriber all-optical wavelength conversion unit.

The present invention also provides a signal transmission method, comprising:

converting a plurality of initial optical signals with a same wavelength into optical signal with different wavelengths at an office optical line terminal, multiplexing and then transmitting the optical signals to a subscriber side via a fiber, demultiplexing the optical signals by a subscriber all-optical wavelength conversion unit and transmitting the optical signals with different wavelengths to a corresponding optical couplers respectively, and allocating the optical signals by the optical couplers to optical network units connecting thereto.

Furthermore, the signal transmission method also comprises:

converting optical signals with the same wavelength emitted by a plurality of optical network units into optical signals with different wavelengths by the subscriber all-optical wavelength conversion unit, multiplexing and transmitting the optical signals to the office side via a fiber, demultiplexing the optical signals by the office optical line terminal, thereby receiving each of optical signals with different wavelengths.

The present invention also provides a signal transmission method, comprising:

multiplexing a plurality of initial optical signals with different wavelengths at an office optical line terminal, transmitting the optical signals to a subscriber side via a fiber, demultiplexing the optical signals at the subscriber side, and transmitting the optical signals with different wavelengths to a corresponding optical couplers respectively, and then allocating the optical signals by the optical coupler to optical network units connecting thereto.

Furthermore, the signal transmission method also comprises:

converting a plurality of transmitted optical signals with a same wavelength into optical signals with different wavelengths by a subscriber all-optical wavelength conversion unit, multiplexing and transmitting the optical signals to the office side via a fiber, demultiplexing the optical signals by the office optical line terminal, thereby receiving each of optical signals with different wavelengths.

The technical solution of the present invention has the following two advantages: 1. the present invention facilitates full use of the existing source of access network and ensures a smooth transition from the time division multiplexing passive optical network to the optical access network of the next generation without changing the structure of the current time division passive optical network; 2. transmission via a single fiber is achieved between the OLT and the ONU through multiple wavelengths and high branch ratio, thus greatly increasing the utilization of the fiber and reducing the cost for laying fiber; 3. the present invention facilitates achievement of optical connection between an optical line terminal (OLT) and a colorless optical network unit (ONT) at a subscriber end device and reduces the cost of mounting, maintenance and storage of the ONU based on all-optical wavelength converter wavelength division multiplexing passive optical network (AOWC-WDM-PON) without changing the wavelength of an optical network unit (ONU) of a subscriber end in a passive optical network; 4. the cost can be greatly reduced when the office end adopts a low-cost converter with a particular wavelength; and 5. an access network can maintain a feature of "passive" when a subscriber uses remote-pump (probe light is remotely transmitted) optical wavelength converter.

PREFERRED EMBODIMENTS OF THE PRESENT INVENTION

The technical scheme of the present invention will be described in further detail in conjunction with the accompanying drawings and the embodiments.

The core idea of the present invention is: to realize a colorless ONU of WDM-PON using as simple network technology as possible, and meanwhile achieve smooth transition from the initial TDM-PON technology; achieve transmission via a single fiber between the OLT and the ONU through multiple wavelengths and high branching ratio to greatly increase the utilization of the fiber and reduce the cost for laying fiber.

Figure 1:
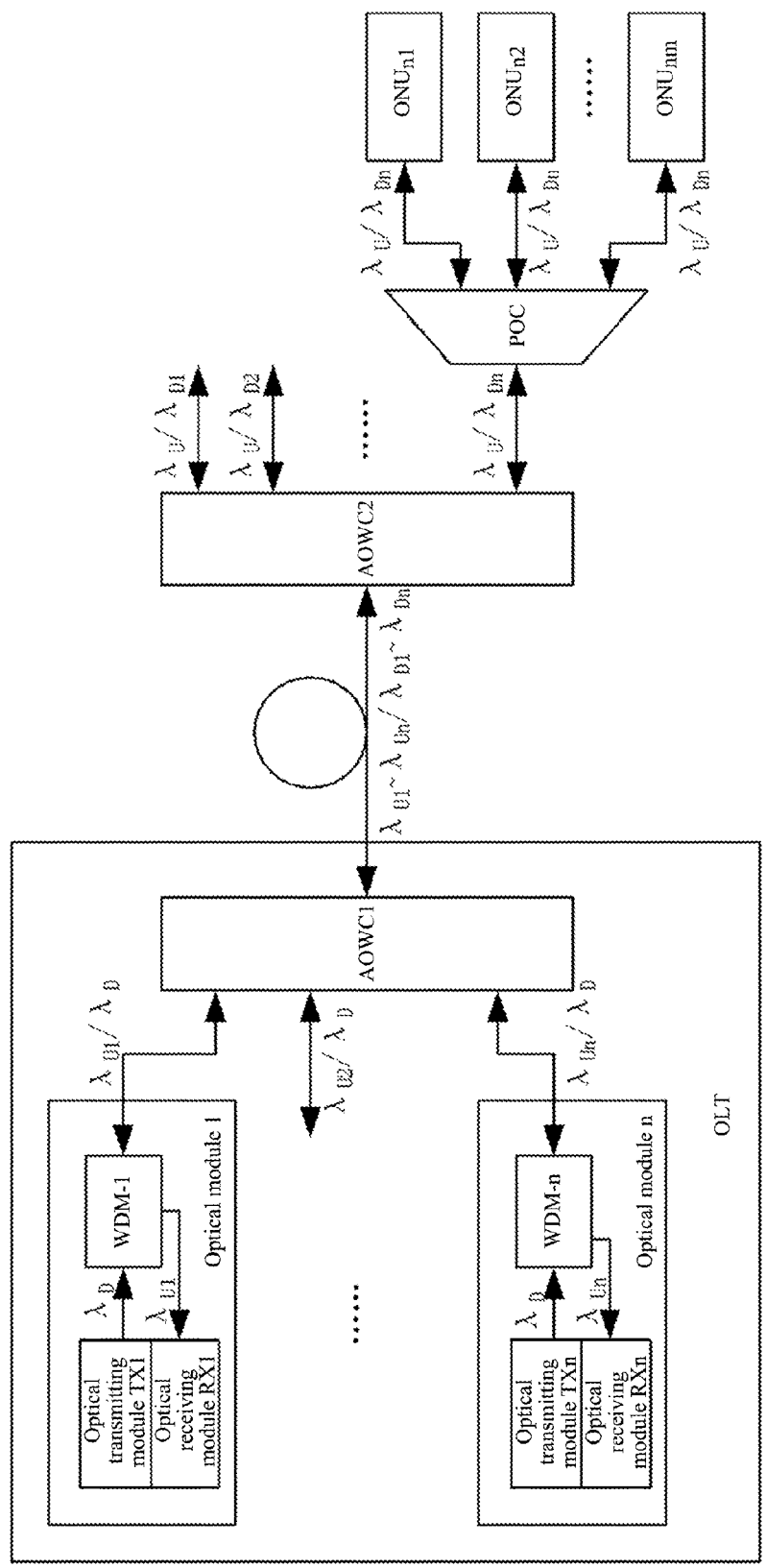
FIG. 1 is an illustration for the structure of a wavelength division and time division hybrid multiplexing passive optical network system based on wavelength conversion according to an embodiment of the present invention.

FIG. 1 is an illustration for the structure of a wavelength division and time division hybrid multiplexing passive optical network system based on wavelength conversion according to the present invention. The system comprises n optical modules (optical module 1~optical module n) of a time division multiplexing PON unit at an OLT side, an office all-optical wavelength converter (AOWC) unit 1 (AOWC1), a subscriber AOWC unit (AOWC2) as well as n passive optical couplers (POCs) of the time division multiplexing PON unit and n×m ONUs ($ONU_{11}$~$ONU_{nm}$), wherein n and m are natural numbers. AOWC1 and AOWC2 are connected with each other via a fiber. Each optical module comprises an optical transmitting module (e.g., TX1), an optical receiving module (e.g., RX1) and a wavelength division multiplexer (e.g., WDM-1). The optical signals with a wavelength of $\lambda_D$ transmitted by each optical module in the downlink direction are converted into optical signals with wavelengths of $\lambda_{D1}$-$\lambda_{Dn}$ in AOWC1, and are coupled to the transmission fiber for downward transmission, and the optical signals with different wavelengths ($\lambda_{D1}$-$\lambda_{Dn}$) are demultiplexed by AOWC2, and then transmitted to a corresponding POC respectively, i.e., optical signals with different wavelengths are transmitted to different POCs respectively, and then are allocated to the connected ONUs by the POCs. For example, the POC shown in FIG. 1 allocates the signals to $ONU_{11}$~$ONU_{nm}$.

The optical signals with a wavelength of $\lambda_U$ transmitted by each ONU in the uplink direction are transmitted to AOWC2 after being collected by the corresponding POC, and the uplink optical wavelength of each ONU is converted into optical signals with wavelengths of $\lambda_{U1}$-$\lambda_{Un}$, correspondingly depending upon the corresponding PON unit, and are coupled to the transmission fiber for upward transmission.

The optical signals with different wavelengths ($\lambda_{U1}$-$\lambda_{Un}$) are demultiplexed using AOWC1 and then are transmitted to each optical module of the time division multiplexing PON unit, i.e., optical signals with different wavelengths are transmitted to different optical modules respectively.

Wherein, n optical modules and the office AOWC unit (shown as AOWC1 in FIG. 1) can be integrated into one OLT.

In FIG. 1, optical modules of a time division multiplexing PON unit are adopted, and in practical applications, they may be replaced by other optical modules. Additionally, in practical applications, POC may be connected with one or more ONUs, AOWC1 may also be connected with one or more optical modules, and AOWC2 may also be connected with one or more POCs.

Figure 3:
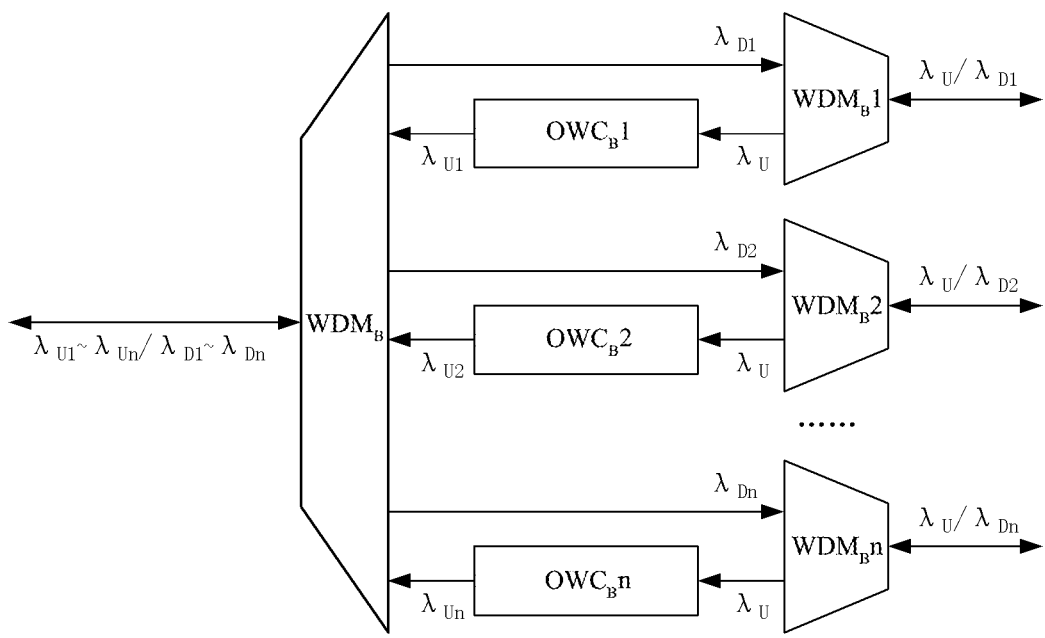
FIG. 3 is an illustration for the structure of a subscriber all-optical wavelength conversion unit according to an embodiment of the present invention.

Additionally, the subscriber AOWC unit (AOWC2) may be made of passive wavelength conversion media, and the probe light source may be disposed in the office end, for example, it can be integrated into the OLT of the office end; specifically, the subscriber optical wavelength converter OWC (as shown in FIG. 3, OWC1~OWCn) is made of passive wavelength conversion media.

Figure 2:
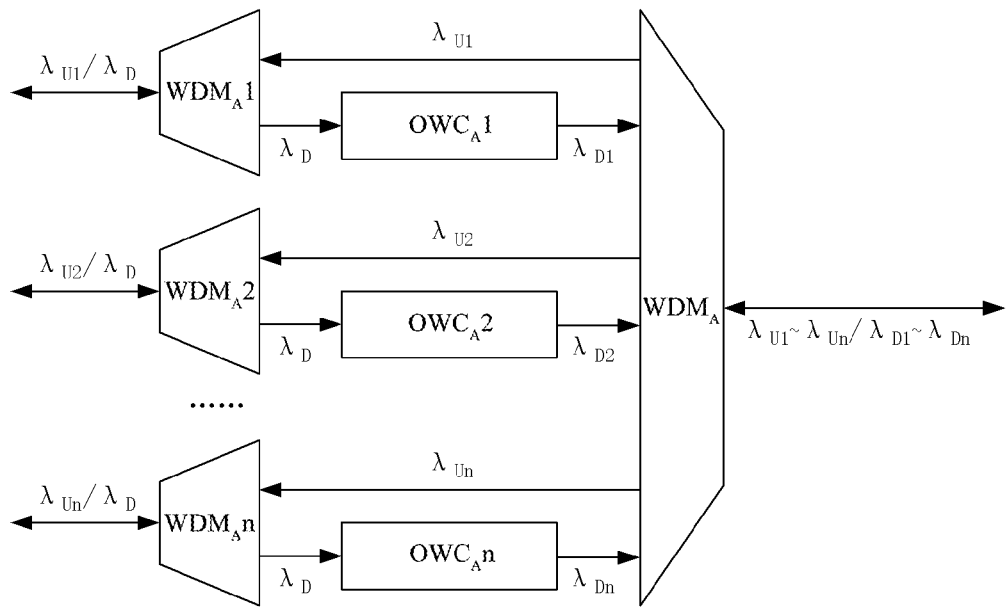
FIG. 2 is an illustration for the structure of an office all-optical wavelength conversion unit according to an embodiment of the present invention.

FIG. 2 is an illustration for the structure of an office all-optical wavelength conversion unit according to the present invention. The unit comprises n office 3-port WDMs—for example $WDM_A 1$~$WDM_A n$, n office OWCs—for example $OWC_A 1$~$OWC_A n$, and one 2n+1-port office WDM (herein referred to as $WDM_A$ for short). An uplink multiplexing port of the $WDM_A 1$ is connected with one of the uplink demultiplexing ports of the $WDM_A$, a downlink demultiplexing port of the $WDM_A 1$ is an input port of the $OWC_A 1$, an output port of the $OWC_A 1$ is connected with one of the downlink multiplexing ports of the $WDM_A$, and the third port of the $WDM_A 1$ is connected with an optical module at the OLT side, for example, the third port of the $WDM_A 1$ may be physically connected with the optical module at the OLT side via a fiber. The connection manner for $WDM_A 2$ with the $OWC_A 2$ and $WDM_A$ is the same, and so forth. $WDM_A 1$~$WDM_A n$ receive downlink optical signals with a wavelength of $\lambda_D$, demultiplex and then send them out, and $OWC_A 1$~$OWC_A n$ convert $\lambda_D$ to $\lambda_{D1\sim Dn}$ respectively depending upon different optical modules at the OLT side. Downlink wavelengths of $\lambda_{D1}$~$\lambda_{Dn}$, should be selected within the scope of the wavelength receivable by the optical receiving module of the ONU, wherein n is a natural number, i.e., there are at least two office OWCs and at least two office 3-port WDMs. If there is only one optical module in a practical application, then the third ports of the additional office 3-port WDMs are idle.

FIG. 3 is an illustration for the structure of a subscriber all-optical wavelength conversion unit according to the present invention. The unit comprises one 2n+1-port subscriber WDM (herein referred to as $WDM_B$ for short), n subscriber OWCs ($OWC_B 1$~$OWC_B n$), and n subscriber 3-port WDMs ($WDM_B 1$~$WDM_B n$). An downlink multiplexing port of the $WDM_B 1$ is connected with one of the downlink demultiplexing ports of the $WDM_B$, an uplink demultiplexing port of the $WDM_B 1$ is connected with an input port of the $OWC_B 1$, an output port of the $OWC_B 1$ is connected with one of the uplink multiplexing ports of the $WDM_B$, and the third port of the $WDM_B 1$ is connected with a POC, for example, the third port of the $WDM_B 1$ may be physically connected with the POC via a fiber. The connection manner for $WDM_B$ with the $WDM_B 2$ and $OWC_B 2$ is the same, and so forth. $WDM_B 1$~$WDM_B n$ receive uplink optical signals with a wavelength of $\lambda_U$, demultiplex and then send them out, and $OWC_B 1$~$OWC_B n$ convert $\lambda_U$ into $\lambda_{U1\sim Un}$ respectively depending upon different optical modules at the OLT side.

Uplink wavelengths of $\lambda_{U1}$~$\lambda_{Un}$ should be selected within the scope of the wavelength receivable by the optical receiving module of the OLT, wherein n is a natural number, i.e., there are at least two subscriber OWCs and at least two subscriber 3-port WDMs in the subscriber all-optical wavelength conversion unit. If there is only one POC in a practical application, then the third ports of the additional subscriber 3-port WDMs are idle.

Since different ports of AOWC have different wavelengths, optical signals with different wavelengths can be sent to the optical module connected with the port that outputs the wavelength according to the connection relationship between each port of the AOWC (is actually an interior WDM component) and the optical module (or optical coupler). Since a low-cost fixed wavelength converter is used at the office end, which can greatly reduce cost, the optical wavelength converter in the office all-optical wavelength conversion unit described in the present invention can adopt a semiconductor all-optical wavelength converter based on cross gain modulation of a semiconductor optical amplifier (XGM-SOA), wherein an optical signal with a certain wavelength enters through an input port of the 3-port filter, then is transmitted into a semiconductor optical amplifier chip via an reflection port of the filter and the reflection filter, and then modulate DC probe light to form converted optical signal with another wavelength. The converted optical signal then enters the 3-port filter via the reflection filter and the reflection port of the 3-port filter, and the modulated optical signal with a converted wavelength is output through its transmission port. The semiconductor all-optical wavelength converter belongs to the prior art, and has been described in "A Semiconductor All-optical Wavelength Converter" (Filing No.: 200510019270) in detail. Other kind of Optical wavelength converters can also be used, for example, optical wavelength conversion based on cross-phase modulation of a semiconductor optical amplifier and four-wave mixing, optical wavelength conversion based on fiber nonlinear effects, optical wavelength conversion based on "optical-electric-optical" and so on. When the "passive" feature of an access network needs to retain, the optical wavelength converter in the subscriber all-optical wavelength conversion unit can also adopt the form of remotely pumping (the probe light is remotely transmitted).

The (2n+1)-port wavelength division multiplexer in the all-optical wavelength conversion units of the present invention may be a (1×2n)-port arrayed waveguide grating, wherein n ports from the 2n ports are selected as the demultiplexing output ports and the rest n ports are used as multiplexing input ports.

It can be seen from the wavelength division and time division hybrid multiplexing passive optical network system based on wavelength conversion shown in FIG. 1, the office all-optical wavelength conversion unit shown in FIG. 2 and the terminal all-optical wavelength conversion unit shown in FIG. 3 that the present invention facilitates achievement of optical connection between an optical line terminal (OLT) and a colorless optical network unit (ONT) in a subscriber terminal device and reduces the cost of mounting, maintenance and storage of the ONU based on all-optical wavelength converter wavelength division multiplexing passive optical network (AOWC-WDM-PON) without changing the wavelength of an optical network unit (ONU) at a subscriber end in a passive optical network, and an access network can maintain a feature of "passive" when a subscriber uses remote-pump (probe light is remotely transmitted) optical wavelength converter.

Figure 4:
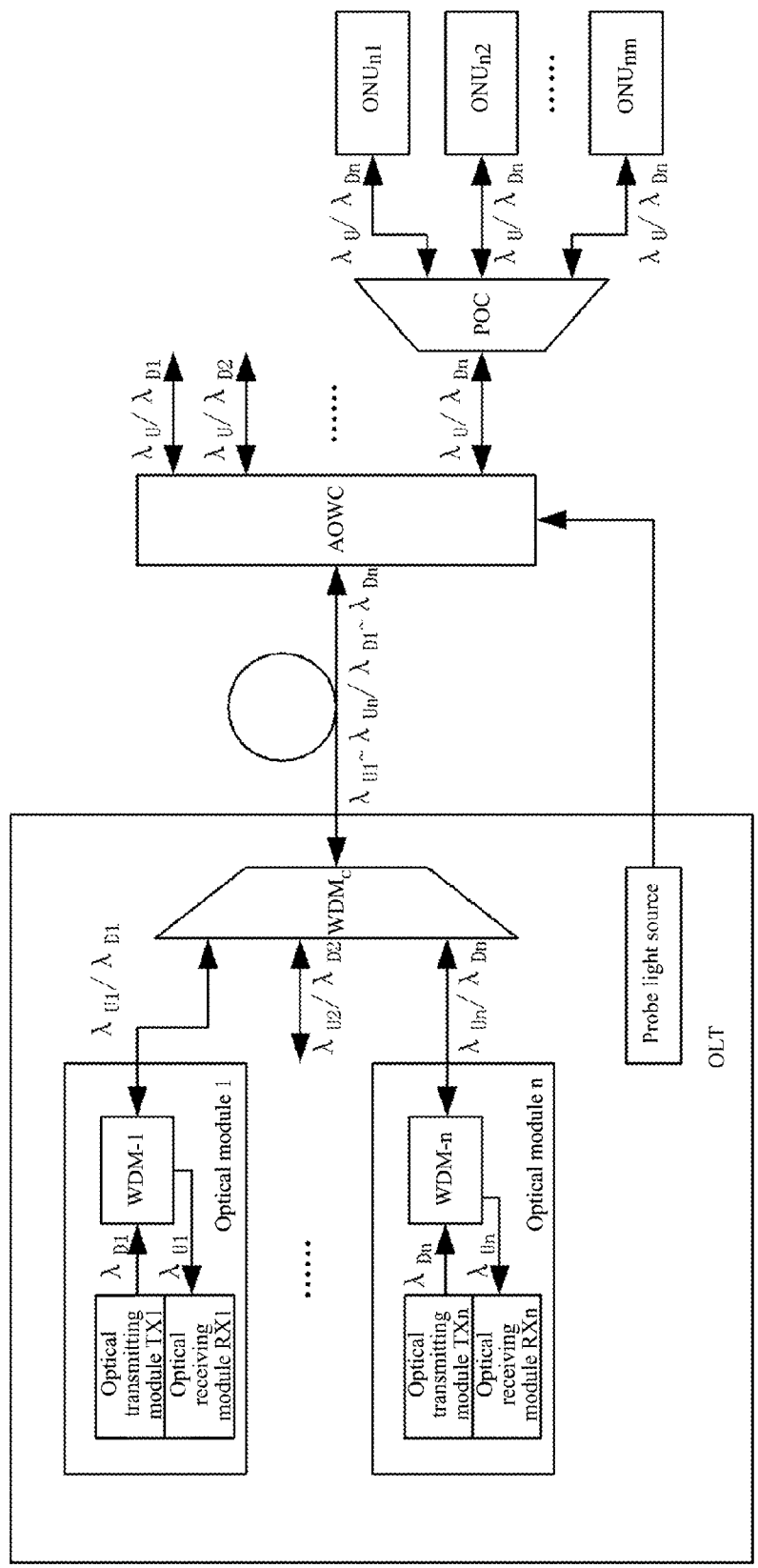
FIG. 4 is an illustration for the structure of a wavelength division and time division hybrid multiplexing passive optical network system based on remote-pump wavelength conversion according to an embodiment of the present invention.

FIG. 4 is an illustration for the structure of a wavelength division and time division hybrid multiplexing passive optical network system based on remote-pump wavelength conversion according the present invention. n optical modules with specific transmission wavelengths at the OLT side are connected with an office WDM (herein referred to as $WDM_C$ for short), the $WDM_C$ is connected with a subscriber AOWC unit (herein referred to as AOWC for short) via a transmission fiber, and the AOWC is connected to n POCs in the downlink direction, each of which is connected to a plurality of ONUs in the downlink direction.

In practical applications, a POC can be connected with one or more ONUs, an AOWC can also be connected with one or more POCs, and an office WDM can also be connected with one or more optical modules with specific transmission wavelengths.

Wherein, each optical module comprises an optical transmitting module (e.g., TX1), an optical receiving module (e.g., RX1), and a wavelength division multiplexer (e.g., WDM-1).

As shown in FIG. 4, the optical module has a structure as shown in FIG. 1, and thus no further description is provided here for avoiding redundancy. The structure of the subscriber all-optical wavelength conversion unit is the same as shown in FIG. 3, and thus no further description is provided here for avoiding redundancy.

The wavelength division and time division hybrid multiplexing passive optical network based on remote-pump wavelength conversion is specifically implemented as follows:

(1) firstly determining the number of the wavelengths for wavelength division multiplexing, the nominal wavelength of wavelength division multiplexing, and band width;

(2) the optical module with a specific transmission wavelength at the OLT side using an optical receiving module, optical transmitting module and pump light source with the nominal wavelength of wavelength division multiplexing, the colorless ONU using optical receiving and transmitting modules with a uniform and standard wavelength in a PON system.

(3) in the downlink direction, the optical transmitting modules (TX1~TXn) with specific transmission wavelengths in the optical modules in n PON units at the OLT side transmitting optical signals with specified wavelength division multiplexing wavelengths $\lambda_{D1}$~$\lambda_{Dn}$. The optical signals with specified wavelength division multiplexing wavelengths $\lambda_{D1}$~$\lambda_{Dn}$, being combined by the $WDM_C$, and then being transmitted via a single fiber.

(4) the wavelength division multiplexing wavelength transmitted on a single fiber being converted into different nominal wavelengths $\lambda_{D1}$~$\lambda_{Dn}$ by the AOWC, and then being sent to the optical receiving module of each ONU via the POCs.

(5) in the uplink direction, each ONU transmitting an optical signal with an uplink nominal wavelength $\lambda_U$ in a specified time slot, and the optical signals being combined into a complete uplink frame signal by the POC.

(6) the optical signals with an uplink nominal wavelength $\lambda_U$ being converted into optical signals with the specified wavelength division multiplexing wavelengths $\lambda_{D1}$~$\lambda_{Dn}$ and being combined, and then being transmitted on a single fiber; afterwards, they being separated by the $WDM_C$, and the optical signals with the specified wavelength division multiplexing wavelengths $\lambda_{D1}$~$\lambda_{Dn}$ being sent to the corresponding optical receiving modules (RX1~RXn) among the optical modules at the OLT side.

(7) a probe (pump) light source being provided at the office end and being connected with the AOWC via a fiber, thus achieving remotely pumping (the probe light being transmitted remotely).

Additionally, the probe light source can be integrated into the OLT at the office end, i.e., n optical modules, the office WDM and the probe light source can be integrated into one OLT. When the probe light source is provided at the office end, the subscriber AOWC is made of passive wavelength conversion media.

By using the wavelength division and time division hybrid multiplexing passive optical network based on remote-pump wavelength conversion, the present invention facilitates achievement of optical connection between an optical line terminal (OLT) and a colorless optical network unit (ONT) in a subscriber terminal device and reduces the cost of mounting, maintenance and storage of the ONU based on all-optical wavelength converter wavelength division multiplexing passive optical network (AOWC-WDM-PON) without changing the wavelength of an optical network unit (ONU) of a subscriber end in a passive optical network.

In the wavelength division and time division hybrid multiplexing passive optical networks shown in FIG. 1 and FIG. 4, the present invention also provides two kinds of optical line terminals: one is shown in FIG. 1, comprising at least two optical modules (can also be one in practical applications) and an office AOWC unit, wherein the optical modules generate optical signals with the same wavelength in the downlink direction, and send the optical signals to the office AOWC unit, and the office AOWC unit converts the optical signals into optical signals with different wavelengths and multiplexes the optical signals with different wavelengths; in the uplink direction, the office AOWC unit demultiplexes the optical signals with different wavelengths and then sends them to the optical modules. Furthermore, the optical line terminal also comprises a probe light source for providing probe light for the subscriber AOWC unit. Another kind of optical line terminal as shown in FIG. 4 comprises at least two optical modules with specific transmission wavelengths (can also be one in practical applications) and an office WDM, wherein the optical modules generate optical signals with different wavelengths in the downlink direction, and send the optical signals to the office WDM, and the office WDM multiplexes the optical signals; in the uplink direction, the office WDM demultiplexes the optical signals with different wavelengths and then sends them to the optical modules. Furthermore, there is also a probe light source for providing probe light for the subscriber AOWC unit.

The signal transmission method used in the wavelength division and time division hybrid multiplexing passive optical network system according to the present invention will be described in the following part. The signal transmission method used in the wavelength division and time division hybrid multiplexing passive optical network system based on wavelength conversion as shown in FIG. 1 comprises: converting at least two initial optical signals with the same wavelength into optical signal with different wavelengths at an office optical line terminal (OLT) side, multiplexing and then sending to a subscriber end via a fiber, demultiplexing in the subscriber end and sending the optical signals with different wavelengths to each specified (i.e., connected with the port transmitting signals with the corresponding wavelength) passive optical coupler (POC), which then allocates them to the corresponding (i.e., connected) optical network unit (ONU); this process describes the signal transmission in the downlink direction, and in the uplink direction, the subscriber converts at least two signals with the same wavelength sent out by the ONU into optical signals with different wavelengths, multiplexing and then sending them to an office end via a fiber, and the office end demultiplexing to receive the optical signals with different wavelengths.

The signal transmission method used in the wavelength division and time division hybrid multiplexing passive optical network system based on remotely-pumping wavelength conversion as shown in FIG. 4 comprises: multiplexing at least two initial optical signals with different wavelengths at an office optical line terminal (OLT) side, transmitting to an subscriber end via a fiber, demultiplexing by a subscriber AOWC unit and transmitting optical signals with different wavelengths to each specified (i.e., connected with the port transmitting signals with the corresponding wavelength) passive optical coupler (POC) respectively, which then allocates them to the corresponding (i.e., connected) ONU; this process describes the signal transmission in the downlink direction, and in the uplink direction, the subscriber AOWC unit converts at least two signals with the same wavelength sent out by the ONU into optical signals with different wavelengths, multiplexing and then sending them to an office end via a fiber, and the office optical line terminal demultiplexing to receive the optical signals with different wavelengths.

Before the signal transmission in the uplink and downlink directions described in the signal transmission method of the present invention, the present invention also firstly determine number of the wavelengths for wavelength division multiplexing, the nominal wavelength of wavelength division multiplexing and band width. The optical module at the OLT side uses an optical receiving module, optical transmitting module and pump light source with the nominal wavelength of wavelength division multiplexing. A colorless ONU uses optical receiving and transmitting modules with a uniform and standard wavelength in a PON system.

Lastly, it should be noted that the above examples are only used to describe the technical scheme of the present invention, but not meant to limit the present invention. Although the present invention is described in detail with reference to the above preferred embodiments, a person skill in the art will appreciate that modifications or equivalent substitutions can be made to the technical scheme of the present invention without departing from the spirit or scope of the invention, and those modifications or equivalent substitutions shall all fall into the scope of the claims appended hereto.

INDUSTRIAL APPLICABILITY

The present invention facilitates full use of the existing resource of access network and ensures a smooth transition from the time division multiplexing passive optical network to the optical access network of the next generation without changing the structure of the current time division passive optical network. Transmission via a single fiber is achieved between the OLT and the ONU through multiple wavelengths and high branching ratio, thus greatly increasing the utilization of the fiber and reducing the cost for laying fiber.

What we claim is:

1. An office all-optical wavelength conversion unit, comprising:
at least two office 3-port wavelength division multiplexers, at least two office optical wavelength converters and an office wavelength division multiplexer, wherein;
an uplink multiplexing port of each office 3-port wavelength division multiplexer respectively connects with an uplink demultiplexing port of the office wavelength division multiplexer;
a downlink demultiplexing port of each office 3-port wavelength division multiplexer respectively connects with an input port of a respective office optical wavelength converter;
an output port of each office optical wavelength converter connects with a downlink multiplexing port of the office wavelength division multiplexer; and
a third port of each office 3-port wavelength division multiplexer is configured to connect with an optical module respectively;
and wherein:
the office 3-port wavelength division multiplexers are configured to respectively multiplex and demultiplex optical signals with different wavelengths in uplink and downlink directions and
the office optical wavelength converters are configured to convert downlink optical signals with the same wavelength emitted by the optical modules and received from the office 3-port wavelength division multiplexers into the optical signals with different wavelengths, and to send the optical signals with different wavelengths to the office wavelength division multiplexer for multiplexing.

2. A subscriber all-optical wavelength conversion unit, comprising;
a subscriber wavelength division multiplexer, at least two subscriber optical wavelength converters and at least two subscriber 3-port wavelength division multiplexers, wherein;
a downlink multiplexing port of each subscriber 3-port wavelength division multiplexer respectively connects with a downlink demultiplexing port of the subscriber wavelength division multiplexer;
an uplink demultiplexing port of each subscriber 3-port wavelength division multiplexer respectively connects with an input port of a respective subscriber optical wavelength converter; p1 an output port of each subscriber optical wavelength converter connects with an uplink multiplexing port of the subscriber wavelength division multiplexer; and
a third port of each subscriber 3-port wavelength division multiplexer is configured to connect with an optical coupler respectively;
and wherein:
the subscriber 3-port wavelength division multiplexers are configured to respectively demultiplex and multiplex optical signals with different wavelengths in uplink and downlink directions; and
the subscriber optical wavelength converters are configured to convert uplink optical signals with a same wavelength emitted by optical network units and received from the subscriber 3-port wavelength division multiplexers into the optical signals with different wavelengths, and to send the optical signals with different wavelengths to the subscriber wavelength division multiplexer for multiplexing.

3. The subscriber all-optical wavelength conversion unit according to claim 2, wherein:
the subscriber optical wavelength converters are made of passive wavelength conversion media, a probe light source for the subscriber optical wavelength converters is configured to be disposed at an optical line terminal side, and remote transmission of probe light is implemented through a fiber; or
the subscriber optical wavelength converters are made of active wavelength conversion media.

4. An optical line terminal, comprising at least two optical modules and an office all-optical wavelength conversion unit, wherein:
the optical modules are configured to generate optical signals with a same wavelength in a downlink direction, and to send the optical signals with the same wavelength to the office all-optical wavelength conversion unit; and
the office all-optical wavelength conversion unit is configured to convert the optical signals with the same wavelength into optical signals with different wavelengths in the downlink direction, to multiplex the optical signals with different wavelengths in an uplink direction, and then to send the uplink optical signals to the optical modules at an optical line terminal side for reception;

and wherein:

the office all-optical wavelength conversion unit comprises at least two office 3-port wavelength division multiplexers, at least two office optical wavelength converters and an office wavelength division multiplexer, wherein;

an uplink multiplexing port of each office 3-port wavelength division multiplexer respectively connects with an uplink demultiplexing port of the office wavelength division multiplexer;

a downlink demultiplexing port of each office 3-port wavelength division multiplexer respectively connects with an input port of a respective office optical wavelength converter;

an output port of each office optical wavelength converter connects with a downlink multiplexing port of the office wavelength division multiplexer; and a third port of each office 3-port wavelength division multiplexer connects with an optical module respectively;

the office 3-port wavelength division multiplexers respectively multiplex and demultiplex the optical signals with different wavelengths in uplink and downlink directions; and the office optical wavelength converters convert downlink optical signals with the same wavelength emitted by the optical modules and received from the office 3-port wavelength division multiplexers into optical signals with different wavelengths, and send the optical signals with different wavelengths to the office wavelength division multiplexer for multiplexing.

5. An optical line terminal according to claim 4, further comprising a probe light source configured to provide probe light for a subscriber all-optical wavelength conversion unit.

* * * * *

UNITED STATES PATENT AND TRADEMARK OFFICE
CERTIFICATE OF CORRECTION

PATENT NO. : 8,554,079 B2
APPLICATION NO. : 12/676588
DATED : October 8, 2013
INVENTOR(S) : Liu et al.

Page 1 of 1

It is certified that error appears in the above-identified patent and that said Letters Patent is hereby corrected as shown below:

On the Title Page

Item [73] Assignee

Beneath "ZTE Corporation, Wuhan (CN)" insert
--Huazhong University of Science and Technology, Wuhan (CN)--

Item [57] Abstract

Line 10, delete "each optical couplers" and insert --each optical coupler-- therefor.

Signed and Sealed this
Twenty-fifth Day of March, 2014

Michelle K. Lee
*Deputy Director of the United States Patent and Trademark Office*